United States Patent
Tethal et al.

(10) Patent No.: US 9,950,451 B2
(45) Date of Patent: Apr. 24, 2018

(54) METHOD OF MANUFACTURE OF PRODUCTS FROM GEOPOLYMER COMPOSITE

(75) Inventors: Tomas Tethal, Husinec-Rez (CZ); Michaela Steinerova, Praha 9 (CZ); Jiri Houfek, Janov nad Nisou (CZ)

(73) Assignee: IQ STRUCTURES S.R.O., Husinec-Rez (CZ)

( * ) Notice: Subject to any disclaimer, the term of this patent is extended or adjusted under 35 U.S.C. 154(b) by 169 days.

(21) Appl. No.: 14/358,636

(22) PCT Filed: Aug. 29, 2012

(86) PCT No.: PCT/CZ2012/000087
§ 371 (c)(1),
(2), (4) Date: May 29, 2014

(87) PCT Pub. No.: WO2013/071899
PCT Pub. Date: May 23, 2013

(65) Prior Publication Data
US 2014/0300030 A1   Oct. 9, 2014

(30) Foreign Application Priority Data

Nov. 15, 2011   (CZ) .................................. 2011-732

(51) Int. Cl.
C04B 41/51   (2006.01)
C04B 41/88   (2006.01)
B29C 39/00   (2006.01)
C04B 41/00   (2006.01)
B29C 33/58   (2006.01)

(52) U.S. Cl.
CPC ............ B29C 39/003 (2013.01); B29C 33/58 (2013.01); C04B 41/009 (2013.01); C04B 41/51 (2013.01); C04B 41/88 (2013.01); Y02P 40/165 (2015.11)

(58) Field of Classification Search
CPC ....... B29C 39/003; B29C 33/58; C04B 41/88; C04B 41/009; C04B 41/51; C04B 28/006; Y02P 40/165; C23C 24/04; C23C 24/087; C23C 4/134; C23C 14/18; C23C 14/185; C23C 14/34; C23C 16/06; C23C 2/04; C23C 18/1639; C23C 18/31; C25D 7/00
See application file for complete search history.

(56) References Cited

U.S. PATENT DOCUMENTS

| 4,330,243 A * | 5/1982 | Legrand | B28B 23/06 264/228 |
| 4,721,757 A * | 1/1988 | Schindler | C04B 24/2641 525/245 |
| 5,360,284 A * | 11/1994 | Allard | E03F 5/041 404/2 |
| 2001/0016262 A1* | 8/2001 | Toyoshima | C03C 17/002 428/428 |
| 2004/0069650 A1* | 4/2004 | Yoshimura | C23C 18/54 205/164 |
| 2005/0241534 A1* | 11/2005 | Li | C04B 28/02 106/672 |
| 2007/0028548 A1* | 2/2007 | Johnson | B28B 7/241 52/596 |
| 2007/0125272 A1* | 6/2007 | Johnson | C04B 28/26 106/638 |
| 2010/0225026 A1* | 9/2010 | Madsen | B28B 7/384 264/338 |
| 2011/0132230 A1* | 6/2011 | Han | C04B 12/005 106/600 |
| 2012/0152153 A1* | 6/2012 | Gong | C04B 28/006 106/705 |

FOREIGN PATENT DOCUMENTS

CN   1895914   *  1/2007
GB   1 404 189  *  8/1975

OTHER PUBLICATIONS

Okada, et al "Water retention properties of porous geopolymers for use in cooling applications" Journal of the European Ceramic Society 29 (2009) pp. 1917-1923.*
International Search Report and Written Opinion in corresponding International Patent Application PCT/CZ2012/00087 dated Jun. 18, 2013 (7 pages).
Boxley, Chett et al, "Practical Applications of Geopolymers", Ceramic Engineering and Science Proceedings—Developments in Porous, Biological and Geopolymer Ceramics—A Collection of Papers Presented at the 31st International Conference on Advanced Ceramics and Composites 2008 American Ceramic Society USA, vol. 28, No. 9, Jan. 21, 2007, pp. 321-336 (16 pages).

* cited by examiner

Primary Examiner — Katherine A Bareford
(74) Attorney, Agent, or Firm — Hovey Williams LLP

(57) ABSTRACT

A method of manufacture of products from geopolymer composite shaped in a mold which is filled by casting of geopolymer composite in form of a precursor and after its hardening the casting is taken out from the mold and the casting surface is provided with a metallic layer. Before metal-plating casting surface with absorption capacity greater than 5% is treated to make it chemically stable so that pH of a leachate from 100 g of the bulk product in 1000 g distilled water after 24 hours does not exceed 9. In order to reduce the absorption capacity of the casting surface it is penetrated with polymer substances or particles of a non-porous filler are added into the geopolymer composite in the precursor state. The metallic layer on the casting surface is made by a method from the group of methods that include vacuum deposition, vacuum sputtering, galvanization, cold metal spraying, dip coating in melted metal, plasma spraying of melted metal, deposition of metal from metal salt solution or colloid solution or sintering of powder metal.

10 Claims, No Drawings

METHOD OF MANUFACTURE OF PRODUCTS FROM GEOPOLYMER COMPOSITE

RELATED APPLICATIONS

This application is the National Stage of International Patent Application No. PCT/CZ2012/000087, filed Aug. 29, 2012, which is hereby incorporated by reference in its entirety, and which claims priority to Czech Application No. PV 2011-732, filed Nov. 15, 2011.

TECHNICAL FIELD

The invention relates to a method of manufacture of products from geopolymer composite shaped in a mold which is filled by casting of geopolymer composite in form of a precursor and subsequently hardened.

BACKGROUND ART

Metal products are often replaced with plastic ones with metal-plating. The metallic coat on the surface provides the product with a metallic look, as well as electric conductivity, chemical durability, light reflectivity etc. The product is generally lighter as the specific weight of plastic is very low in comparison with metal. Thickness of the metallic layer on the plastic surface is usually from several units to hundreds of micrometers. The metal is usually applied on the surface by galvanization after the first conductive layer is created on the surface. The first layer is usually created by chemical vapor deposition (PCD) or physical vapor deposition in vacuum (PVD). The advantage of metal-plating is a lower price of the product in comparison with an all-metal product because plastic is cheaper than metal and because forming of plastic is more precise in comparison with complicated machining of metal castings.

A disadvantage is lower strength and durability of plastic products, as well as their higher flexibility in comparison with flexibility of a metallic coat. This may cause defects, such as surface cracks, because the supporting structure of a product is made of plastic with additional different properties in comparison with metal, such as, primarily, thermal expansion and thermal conductivity. The low thermal conductivity of the plastic structural part is also the reason that the product feels like plastic rather than metal, which would always take heat from the hand in a usual manner. The objective of this invention is to make products of geopolymer composite with a surface metallic layer while such products may in many cases replace metal products and, in comparison with plastic products, they feature higher mechanical strength and specific weight, higher resistance to high and low temperatures and higher thermal conductivity with a better subjective impression when touching the product with hand or grabbing it.

DISCLOSURE OF INVENTION

The subject matter of the invention is a method of manufacture of products made of geopolymer composite shaped in a mold which is filled by casting of geopolymer composite in form of a precursor and subsequently hardened and taken out from the mold. The principle of the invention consists in application of a metallic layer on the casting surface. Surfaces with absorption capacity higher than 5% shall be treated before the metal-plating to ensure that the product is chemically stable. This means that leachate from 100 g of bulk product in 1000 g of distilled water shall not have pH over 9 even after 24 hours of leaching.

Alternatively, in order to reduce the absorption capacity of the casting surface, the geopolymer composite can be complemented with polymer substances, particularly by penetration, while the polymer substances are selected from a group of polymers including liquid polymers and polymer solutions or suspensions.

To reduce the absorption capacity of the casting surface, particles of a non-porous filler are added into the geopolymer composite in the precursor form, such as silica sand, sintered silicate agglomerate, glass, slag, fly ash, mineral grit and granulates or grits of polymers.

The metallic layer on the casting surface is applied using a method selected from a group of methods that includes vacuum deposition, electrostatic sputtering in vacuum, galvanization, cold metal spraying, dip coating in melted metal, plasma spraying of metal, metal reduction from metal salt solution or colloid solution or by metal powder sintering.

DESCRIPTION OF PREFERRED EMBODIMENTS

1) Manufacture of Structural Parts of Products from Geopolymer Composite.

First a mold is made of an elastomer, e.g. silicone or another flexible material from a group of thermoplastics and reactoplastics, which meets requirements for chemical durability against aggressiveness of the geopolymer precursor. The mold is filled with the precursor, e.g. by casting, spin casting, vibration and pressure casting. Pressure molding and extrusion can be used in case the product is made of a thick grout or paste.

Geopolymer composite in a precursor state is a liquid dispersion, grout or paste in plastic or thixotropic condition at temperatures in the interval from the temperature corresponding to cryoscopic properties of the precursor to the temperature corresponding to thermal decomposition of the precursor. When filling the mold it is necessary to minimize formation of air bubbles and to ensure that the precursor has filled the entire space of the mold so that there are no air bubbles between the precursor and the mold or unfilled details of the mold. This is achieved in the course of mold filling or after the mold is filled, by exposing the mold to vibrations, ultrasound, pressure or vacuum. Another method of filling the mold is on the contrary the foamed geopolymer precursor.

After the geopolymer composite is hardened the casting is taken out from the mold. The mold may be disposable or used repeatedly, it may be made of one part or dismountable.

Geopolymer composite is usually hardened at temperatures from 5 to 50° C., preferably at temperatures of the surrounding environment from 20 to 25° C. The lower limit is defined by cryoscopic properties of the precursor, i.e. by a temperature at which the grout freezes into a solid that cannot flow. The upper limit is defined by technical parameters of the mold, i.e. by the temperature at which the mold material adversely reacts by changing its properties and the temperature of precursor thermal decomposition (depending on which of them is lower). Precursor may be applied in several stages while special attention is paid to quality and adhesion of the precursor surface layer to the mold surface and the subsequent layers are only carrying, reinforcing or filling. Their compositions may be different.

The geopolymer composite precursor is a mixture of filler and binder, where the binder is a reactive substance, alkaline-activated aluminosilicate, which is capable of polymerization. Its polymerization produces an amorphous matrix as a result of sol-gel dispersion of initial agents in alkaline water solution. The reaction is characterized by formation of siloxane bonds Si—O-T (where T=Si or Al in a variable ratio Si:Al) while bridge atoms of oxygen in the initial aluminosilicates are transformed into non-bridge atoms, as a result of decomposition, and back to bridge atoms during polycondensation to produce a solid substance. The conversion may occur both in the air at a normal temperature and pressure and under other conditions (below the freezing point or under higher temperatures up to 300° C. and under any pressure without access of air). The initial raw materials are meta-kaolinite, fly ashes and slags.

The dynamic viscosity of the initial dispersion or grout, during formation of a layer or layers of geopolymer composite by casting, ranges from 1000 to 50000 mPas. The minimum value may be lower and it is limited by sedimentation of the dispersion. The maximum value may be higher and it is limited by a condition when the grout is still able to flow depending on the operating strain. The grout may be also non-sagging to form a wall of a hollow product, which is called a "body" in the ceramics technology. One advantage is the very good ability of the geopolymer composite precursor (for simplicity reasons only the term geopolymer is used in practice) to copy surfaces of the mold with the minimum dimension of detail 0.2 micrometer. As the geopolymer composite dispersion is transformed by a chemical reaction of its micro- and nanoparticles from liquid to solid state, it does not contain big grains of the initial precursor and this enables to copy the mold surface provided with a surface structure with high resolution. Another advantage is the dimensional stability as the products do not change their dimensions when transformed into solid state and therefore they fully copy the mold. Also advantageous is the low price of the material, saving valuable metal raw materials and energy for their processing.

In order to increase product strength while maintaining good copying of the inner surface of the mold, the product can be made from structurally different layers that are apparent on a section perpendicular to the product surface, both by filling with anisotropic fillers with particles of various shapes and sizes and by isotropic fillers and macromolecular substances such as fibers, flakes, whiskers and isotropic macromolecules and microcrystals. Reinforcement may be achieved by a texture formed by fibers and textiles made of mineral and glass melts, melts of carbon, plastics and of metal wires.

Alternatively, reinforcement of the surface of the geopolymer product may be achieved by deposition of other substances (e.g. metals, metal nitrides and functional compounds) or by penetration with reinforcing solutions (e.g. macromolecular substances from the organosilicate group and their solutions). A similar method may be used to achieve electric conductivity of the surface or of the entire volume of geopolymer products.

After the entire composite (geopolymer product) is taken out from the mold it is maintained at a constant humidity, e.g. in air-conditioned premises or wrapped in a foil for a period from several hours to days in order to prevent evaporation of water necessary for stabilization of the product's microstructure to prevent potential formation of microcracks. Alternatively, the surface may be provided with a primer.

The geopolymer binder usually contains $SiO_2$, as a rule from 20 to 95% wt., $Al_2O_3$ from 5 to 80% wt., and other substances recalculated to oxides, such as $Fe_2O_3$ from 0 to 79% wt., CaO from 0 to 79% wt., $Na_2O$ from 0 to 35% wt. and $K_2O$ from 0 to 35% wt., $Li_2O$ from 0 to 35% wt., $TiO_2$ from 0 to 49% wt., $MnO_2$ from 0 to 49% wt., $ZnO_2$ from 0 to 49% wt., $SnO_2$ from 0 to 49% wt., $ZrO_2$ $SnO_2$ from 0 to 49%.

Apart from the binder, the geopolymer composite usually also contains additional fillers, and provided the specific surface of the filler and other added solid substances is greater than $6 \times 10^{-2}$ m$^2$/g then the minimum content of geopolymer binder is 10% wt. without the use of other binders. The filler contains inorganic solid substances selected from a group of oxides, minerals, metals and glass and/or organic substances, including pulverized plastics, and provided the specific surface of the filler and insoluble additives is greater than $6 \cdot 10^{-2}$ m$^2$/g then the minimum content of the binder is 10% wt. Fillers with a lower specific surface may account for up to 98% wt. of the composite.

Alternatively, the aluminosilicate binder may be complemented with other binders from the group of Portland cement, phosphates, natural and synthetic resins and organic macromolecules or their monomers. Alternative minority components include additional additives from the group of metals, as well as B, C, up to 30% wt. Other components (accounting for 0 to 5% wt.) include alternatively other elements of the periodic system, such as contaminants, salt anions (containing e.g. halogens, N and S,) and introduced markers and elements in quantities defined by formation of a required functional effect.

2) Application of Geopolymer Metallic Layers on the Products

Geopolymer products are provided with metallic coats. Several methods may be used for the application, e.g. vacuum deposition, vacuum sputtering, galvanization, cold metal spraying, dip coating in melted metal, plasma spraying of melted metal, reduction of metal from metal salt solution or colloid solution, sintering of metal powder.

All the mentioned technologies of metal-plating require a quality base surface which will not adversely affect the metallic coat. The geopolymer base shall be chemically stable, i.e. it shall not release substances that may cause corrosion of the coat or inhibit formation of the metal coat. This condition is determined by the alkalinity of water in geopolymer pores, while pH of the leachate from leaching of 100 g of bulk product in 1000 g distilled water for 24 hours shall not exceed 9.

Another precondition for formation and keeping of the metal coat is the minimization of pores on the product surface which is defined by absorption capacity i.e. percentage ratio of weight of absorbed distilled water and the weight of the dry product multiplied by one hundred after 1 hour of keeping the product in distilled water. The absorption capacity shall not be greater than 5%. In the opposite case the layer cannot be formed or hold on a too porous surface. This condition may be achieved by penetration of polymer substances and/or suitable composition of the composite, e.g. with an admixture of particles of a nonporous filler.

From among the mentioned metal-plating technologies the most complicated one is chemical metal-plating in a galvanic solution. The other methods are no different from the established practice. The galvanic method has been taken over from known techniques of metal-plating of plastics. It is based on electrochemical deposition of metal on the product's conductive surface. Even the geopolymer product alone may be conductive, provided an appropriate conductive component or mixture of components is added, capable of conducting electricity.

If the geopolymer product alone is not conductive it shall be provided with a conductive layer that is attached by adhesion or by chemical bond to the geopolymer. This may be achieved by e.g. vacuum deposition of metals. In that case the geopolymer product is placed into a vacuum chamber. A boat with melted metal (e.g. copper, silver, zinc etc.) is placed under the product. Vapors of melted metal deposit on the surface of the geopolymer product. For metal-plating of all its sides the product is exposed to metal vapors from several sides, e.g. by rotating the product in the vacuum chamber. In case that metal should be applied only on certain areas the surface may be masked with a mechanical or e.g. printed mask. Similarly, the first conductive coat may be applied by magnetron vacuum deposition, e.g. on metals that are difficult to melt, such as aluminium, chromium, nickel etc.

Another option is chemical deposition of a metal layer on the geopolymer surface. This is used particularly for deposition of silver, nickel and copper. Yet another option is the application of a conductive polymer layer on the surface, particularly organic substances with conjugated chemical bond, use of a carbon-based conductive layer etc.

After the geopolymer surface of the product becomes conductive it is connected to an electrode and placed into a galvanic bath as a cathode. Direct current is introduced with a voltage higher than the deposition potential of the applied metal to form a metal layer on the geopolymer product. This method may be used to apply either one metal (e.g. copper, nickel, chromium, silver, rhodium, gold etc.), or a combination of several metals (e.g. first copper layer and then chromium layer). Electrochemical metal plating can be used also for metal mixtures, e.g. nickel and cobalt.

The geopolymer product provided with a metallic layer is subsequently washed from leftovers of electrolyte, dried and, if required, the surface layer may be finalized, e.g. by polishing.

An example of metal-plating of a surface of non-varnished geopolymer product.

The geopolymer surface is initially conditioned in a buffer made of boric acid and NaOH at pH 9 to 13, ideally 11, at the ambient temperature for ca. 5 minutes. Other buffers, such as phosphate, carbonate or others, may be used as well. Then a special alkaline catalyst is applied, based on $PdSO_4$ or $PdCl_2$, with the concentration of 10-500 mg per 1 l Pd, ideally 50-150 mg per 1 l. The application shall be performed at pH 9 to 13, ideally 11. The catalyst includes borate or phosphate buffer set up at pH 9 to 13, ideally 11, and a complex-forming substance, e.g. tetrahydroxy-propylethylendiamine, NTA, or EDTA in the quantity 0.1-5 g/l. Moreover, a surfactant is added, produced by reaction of acetyl acetone and tetra ethylene pentamine (molar ratio 1:2 to 2:1, ideally 1:1) in the quantity of 0.01-5 g/l. The application time is 2 to 10 minutes, ideally 3 minutes, at 20 to 60° C., ideally 40° C.

This is followed by three-stage washing and then an agent is applied to reduce $Pd^{2+}$ to $Pd^0$, specifically dimethyl aminoborane in borate buffer at pH 5-10, or sodium borohydride at pH 10 to 14.

After another three-stage washing chemical application of copper is performed, using $CuSO_4$ and EDTA (tartaric acid, tetrahydroxypropyl ethylene diamine), formaldehyde and NaOH, or chemical application of nickel, using alkaline nickel at pH8 based on $NiCl_2$ or $NiSO_4$ in presence of sodium hypophosphite and complex-forming substances (citrate, tartarate, pyrophosphate or phosphonate). This is followed by washing and conventional galvanization with Cu, Ni, Cr etc.

Examples of Geopolymer Composition for Metal Plating
1. Product: door knob d=50 mm, with an installed metallic armature or opening for mounting.
Pressure die-cast or pressed into mold, solid product
Composition of the geopolymer composite:
Binder: $SiO_2$ 65% wt., $Al_2O_3$ 15% wt., $Fe_2O_3$ 5% wt., $Na_2O$ 15% wt.,
Filler: agglomerate $SiO_2$—$Al_2O_3$ grain size 0-0.2 mm, filler content in the composite 30% wt.
2. Product: Bathroom Handle, Including Installation Openings
Vibration casting, solid product, penetrated with epoxide resin solution
Composition of the geopolymer composite:
Binder: $SiO_2$ 55% wt., $Al_2O_3$ 20% wt., $Fe_2O_3$ 15% wt., $Na_2O$ 10% wt.,
Filler: agglomerate SiO2, grain size 0.01-0.2 mm, content in the composite 25% wt., agglomerate $MnO_2$ particles size 0-0.1 mm content composite 15% wt.
3. Product: Decorative Head with an Installation Thread
Spin casting, hollow product
Composition of the geopolymer composite:
Binder: $SiO_2$ 67% wt., $Al_2O_3$ 19% wt., CaO 5% wt., $Na_2O$ 3% wt., $K_2O$ 5% wt.,
Filler: nanoparticles of C, content in the composite 3% wt., microparticles PVC content in the composite 1% wt.

INDUSTRIAL APPLICABILITY

In general, the method of manufacture under this invention may be used for the following products: parts, complete products, covers, decorations, grips, handles, doorknobs, opening systems, linings, base plates, wall, filters, packaging, containers, transport boxes, artwork, boards (e.g. desks), switches, change-over switches, sockets, supporting, carrying and attaching systems or parts thereof, frames, jars, tubes, molds, closures, presentation panels etc.

Another group of products includes tools and parts thereof for home, garden, do-it-yourself and industry: Examples of such products include pliers, axes, screwdrivers, knives, scissors, shovels, spades, drills, hammers, clamps, chisels, tightening tools, grinders, attachments, vices, hot air guns, pneumatic hammers, pneumatic drills, milling machines, lathes etc.

Another group of products includes parts of gardening, construction and agricultural technology: The examples include lawn mowers, garden tractors, combine harvesters, collectors, loaders and other agricultural vehicles, excavators, cranes, vacuum cleaners, cleaning machines, polishing machines, as well as handrails, fences and barriers.

The method of manufacture may be also applied on parts of means of transport, i.e. cars, airplanes, ships, trains, motorcycles, tractors, bicycles etc. The parts may include mechanical and electronic components, filters, sensors, interior and decorative equipment, lining, covers, handles, door and window systems. The examples include lights, rear mirrors, engine covers, seat parts, airbag parts, door handles and systems, light holders, emblems (signs).

The technology may be also used for acoustic, fire safety and air conditioning systems, for parts and components of equipment and machines in engineering, textile, chemical, electrotechnical, food-processing industries, etc. Also for optical devices, e.g. microscopes, telescopes, machine tools, assembling machines, packaging machines, printing machines, transport systems and lines, production plants etc.

The technology may be used for traffic signage and signalization e.g. traffic signs, traffic lights, signal boards, signboards, etc.

The technology may be used for parts of household appliances, e.g. cookers, parts of electric and gas ovens, dishwashers, washing machines, refrigerators, tumble driers, microwave ovens, grills, food processors, kitchen robots, slicers, hair driers, curling irons, vacuum cleaners, cleaners, irons, polishers.

In respect to door and furniture systems, the products may include doorknobs, door handles, furniture fittings—handles, door accessories—e.g. door bells, door numbers, knockers, mail boxes—suspended or built-in into doors, curtain cornices, curtain rods, hooks, hangers, switches (room lights). In interior and exterior accessories the technology may be applied for photo and picture frames, stands for wine, pencils, dishes, statues and sculptures, vases, flower pots, ash trays, mirrors, tables, desks, chairs.

In household, office, garden, restaurant or representative premises the invention may be used for candlesticks, stands, clocks—table clock, wall clock, sandglass, architectural accessories and artworks. In fashion and fashion accessories the technology may be used for e.g. costume jewelry and jewelry, brooches, buckles, necklaces, bracelets, earrings, rings, etc., small wares (clothes, shoes), pendants, fashion accessories, buttons, pins, badges, (car) key rings, decorative pendants, wrist watches.

In illumination technology the invention may be used for ceiling lights, chandeliers and their parts, wall and floor lamps, lanterns, bulb sockets, LED lights. In respect to sanitary technology, dishes and closures the invention may be used for water taps, faucets, showers, washing basins, handles, holders for soap, towels and toilet paper, mats, toilet brushes, soap dispensers, etc., bowls, plates, cups, kettles, sugar bowls, salt shakers, dishes, cutlery etc., containers (household and industrial)—for waste, chemicals, food, fondue—jars, stands, lids—food, cosmetics, wine plugs.

Other applications include symbols and signs, e.g. crosses and religious symbols, badges, emblems, coats of arms, ornaments and cemetery items. The application may also include coins and medals, tokens, souvenirs, gifts, toys or their parts, e.g. pens, cigarette lighters, pipes, figurines, souvenirs, toys, board game pieces, money boxes, chess pieces and models.

The invention may be also used for parts of electronic products, e.g. mobile phones, computers, radios, CD, DVD, MP3, Blu-ray players, etc., panels, pushbuttons, sensors, electronic components. Further, for transport and packaging boxes or parts thereof and other diverse products e.g. seals, heating, hangers, covers, caps, umbrellas, pokers—fireplace and fire accessories and for musical instruments.

The invention claimed is:

1. A method of manufacture of products from geopolymer composite shaped in a mold that can replace metal products, said method comprising:

filling the mold with a geopolymer composite precursor;

hardening the geopolymer composite precursor to yield a casting having a surface;

taking said casting out from the mold; and applying a metallic layer on the casting surface to yield a metal coat on said casting surface, wherein the geopolymer composite precursor copies the shape of the mold with minimum dimension detail of 0.2 micrometer.

2. The method of manufacture according to claim 1, wherein said method farther comprises minimizing pores in the casting surface by:

adding additional polymer substances to the casting surface before application of the metallic layer on the casting surface; or adding particles of non-porous filler into the geopolymer composite precursor; so that after minimizing the pores the absorption capacity of the casting surface after hardening and before application of the metallic layer is not greater than 5%, and pH of a leachate from 100 g of the bulk product in 1000 g distilled water after 24 hours does not exceed 9.

3. The method of claim 2, wherein additional polymer substances are added to the casting surface before application of the metallic layer on the casting surface, wherein the additional polymer substances are liquid polymers or polymer solutions or suspension that are added to the casting surface by penetration.

4. The method of claim 2, wherein particles of non-porous filler are added into the geopolymer composite precursor, wherein the non-porous filler is silica sand, sintered silicate agglomerate, glass, slag, fly ash, mineral grit, or and granulates or grits of polymers.

5. The method of manufacture according to claim 1, characterized in that the metallic layer on the casting surface is made by a method selected from the group of consisting of vacuum deposition, vacuum sputtering, cold metal spraying, dip coating in melted metal, plasma spraying of melted metal, deposition of metal from metal salt solution or colloid solution, electrochemical deposition of metal, and sintering of powder metal.

6. The method of claim 1, wherein the geopolymer composite precursor is hardened at temperatures of from 5 to 50° C.

7. The method of claim 1, wherein the geopolymer composite precursor is hardened at temperatures of from 20 to 25° C.

8. The method of claim 1, wherein the geopolymer composite precursor comprises a mixture of filler and binder.

9. The method of claim 8, wherein the binder is an aluminosilicate.

10. The method of claim 8, wherein the filler is an agglomerate with a grain size of less than 0.2 mm.

* * * * *